US008458739B2

(12) United States Patent
Thomas et al.

(10) Patent No.: US 8,458,739 B2
(45) Date of Patent: Jun. 4, 2013

(54) METHOD FOR PROCESSING CONDITIONAL ACCESS CONTENTS BY A USER UNIT

(75) Inventors: Frederic Thomas, Onex (CH);
Sebastien Robyr, Epalinges (CH);
Henri Kudelski, Grandvaux (CH); Guy Moreillon, Bioley-Orjulaz (CH);
Philippe Desarzens, Bussigny (CH)

(73) Assignee: Nagravision S.A., Cheseaux-sur-Lausanne (CH)

( * ) Notice: Subject to any disclaimer, the term of this patent is extended or adjusted under 35 U.S.C. 154(b) by 488 days.

(21) Appl. No.: 12/064,427

(22) PCT Filed: Aug. 8, 2006

(86) PCT No.: PCT/EP2006/065132
§ 371 (c)(1),
(2), (4) Date: Feb. 21, 2008

(87) PCT Pub. No.: WO2007/017499
PCT Pub. Date: Feb. 15, 2007

(65) Prior Publication Data
US 2008/0250444 A1    Oct. 9, 2008

(30) Foreign Application Priority Data
Aug. 9, 2005   (EP) ..................... 05107322

(51) Int. Cl.
*H04N 7/16*      (2011.01)
*H04N 7/167*     (2011.01)
(52) U.S. Cl.
USPC ................................ 725/25; 725/2; 725/31
(58) Field of Classification Search
None
See application file for complete search history.

(56) References Cited

U.S. PATENT DOCUMENTS

| 6,178,242 B1 | 1/2001 | Tsuria |
| 6,512,882 B1 | 1/2003 | Teunissen |

(Continued)

FOREIGN PATENT DOCUMENTS

| EP | 0 858 184 | 8/1998 |
| EP | 1 102 484 | 5/2001 |

(Continued)

OTHER PUBLICATIONS

Notice of Opposition issued in EP 06778191.4 on Feb. 4, 2013.

(Continued)

*Primary Examiner* — Brian Pendleton
*Assistant Examiner* — Jean D Saint Cyr
(74) *Attorney, Agent, or Firm* — DLA Piper LLP (US)

(57) ABSTRACT

A method allows a broadcasted conditional access content accessible at the time of transmission to be also accessible at a later time thanks to intermediate storage on a hard disk of a user unit. The processing method includes the steps of receiving at the user unit a data stream encrypted by at least one control word, at least one control message stream containing the control words, forming an index file, each index comprising an identifier of a control message formed by the extraction of data associated to the control messages and an identifier of the part of the content to which the control message is applied; and, at the time of the deferred processing of the content, extracting at least one part of the control messages and resynchronizing the content with the control messages by the use of the index file, the identifier of the control message allowing the selection of the current control message from a set of control messages at the time of the exploitation of the content identified by the identifier of the part of the content related to this control message.

16 Claims, 1 Drawing Sheet

U.S. PATENT DOCUMENTS

| | | | |
|---|---|---|---|
| 7,079,752 B1 * | 7/2006 | Leyendecker | 386/255 |
| 7,095,948 B2 | 8/2006 | Teunissen | |
| 7,106,749 B1 | 9/2006 | Darshan et al. | |
| 7,580,416 B2 | 8/2009 | Darshan et al. | |
| 2002/0044658 A1 * | 4/2002 | Wasilewski et al. | 380/239 |
| 2002/0080971 A1 | 6/2002 | Fukami et al. | |
| 2003/0072564 A1 | 4/2003 | Teunissen | |
| 2003/0188154 A1 * | 10/2003 | Dallard et al. | 713/153 |
| 2005/0152551 A1 | 7/2005 | Defreese et al. | |
| 2005/0201556 A1 | 9/2005 | Rijckaert et al. | |
| 2006/0075423 A1 * | 4/2006 | Brique et al. | 725/25 |
| 2006/0075440 A1 * | 4/2006 | Rijckaert | 725/88 |
| 2008/0015999 A1 * | 1/2008 | Ali et al. | 705/52 |
| 2009/0100186 A1 | 4/2009 | Darshan et al. | |
| 2009/0150673 A1 * | 6/2009 | DeFreese et al. | 713/170 |

FOREIGN PATENT DOCUMENTS

| | | |
|---|---|---|
| EP | 1215905 A2 | 6/2002 |
| WO | WO 99/62251 | 12/1999 |
| WO | WO 01/35669 | 5/2001 |
| WO | WO 01/91465 | 11/2001 |
| WO | 03/079683 A2 | 9/2003 |
| WO | 03/107665 A1 | 12/2003 |

OTHER PUBLICATIONS

International Search Report, International Patent Application No. PCT/EP2006/065132, International Filing Date: Aug. 8, 2006.

* cited by examiner

METHOD FOR PROCESSING CONDITIONAL ACCESS CONTENTS BY A USER UNIT

The present invention relates to the field of Pay-TV, in particular the processing of a content stored by a user.

This invention applies more precisely to the Pay-TV domain, in which a content is broadcast in an encrypted form, the decryption of this content being authorized in predefined conditions.

STATE OF THE ART

The development of storage on a hard disk has opened up new applications such as television broadcast storage and the preloading of films or other events proposed for purchase.

In a well known method, to be able to visualize a Pay-TV event, such as a film, a sports event or a game in particular, several streams are broadcasted toward a multimedia unit, for example a decoder. In particular, these streams are on one hand the file of the event in the form of an encrypted data stream and on the other hand a control message stream allowing the decryption of the data stream. The content of the data stream is encrypted by at least one "control word" (Control Words=CW) and more generally by control words that are renewed regularly. The second stream is called ECM stream (Entitlement Control Message) and can be formed in two different ways. According to a first method, the control words are encrypted by a key, called a transmission key TK that generally pertains to the transmission system between the management centre and a security module associated with the receiver/decoder. The control word is obtained by decrypting the control messages by means of the transmission key TK.

According to a second method, the ECM stream does not contain directly the encrypted control words, but rather contains data allowing the determination of the control words. This determination of the control words can be carried out by means of different operations, in particular by decrypting, this decryption being able to obtain the control word directly, which corresponds to the first method described above, but the decryption can also result to a piece of data which contains the control word, the latter must also be extracted from the data. In particular, the data can contain the control word as well as a value associated to the content to be broadcasted and in particular the access conditions to this content. Another operation allowing the determination of the control word can use, for example, a one-way hashing function of this conditions information in particular.

The security operations are generally carried out in a security module associated to the multimedia unit or to the decoder. This type of security module can be produced in particular according to four distinct forms. One of these is a microprocessor card, a smart card, or more generally an electronic module (in the form of a key, a badge . . . ). This type of module is generally removable and can be connected to the decoder. The form with electric contacts is the most widely used, but does not exclude a connection without contact for example ISO 14443.

A second known form is that of an integrated circuit shell placed, generally in a definitive and irremovable way in the decoder board. An alternative is made up of a circuit mounted on a base or a connector such as a SIM module connector.

In a third form, the security module is integrated into an integrated circuit shell that also has another function, for example in a descrambling module of the decoder or the microprocessor of the decoder.

In a fourth embodiment, the security module is not produced as hardware, but rather its function is implemented only in the software form. Given that in the four cases, although the security level differs, the function is identical, reference is made to a security module regardless of the way in which its function is carried out or the form that this module can take.

The user unit receiving the data stream and the message stream extracts the messages in order to transmit them to the security module. As the messages arrive at the same time as the data, the security module can transmit the active control word as early as this is necessary. According to the systems used, a control message can comprise more than one control word, for example two, so that the user unit constantly disposes of the current control word and of the following control word.

It is possible that in addition to the use of the event in broadcast mode, this same event is stored on the hard disk of the user unit for subsequent use. This process raises two problems, namely the definition of the access conditions and the renewal of the transmission key TK.

The first problem to arise concerns the management of the access to this content, namely that the conditions for one broadcast mode can be different to the conditions of a different mode. One solution is to multiply the access conditions in the control message as described in the document WO 01/80563.

In order to resolve the second problem, it has been proposed to create a key safe on the hard disk to memorize the transmission key TK valid at the time of the transmission of the event (see WO 03/079683).

The content distribution operators require a more flexible solution that offers the same advantages.

The document WO 03/107665 describes a solution including the creation of an index list formed at the time of the reception of the content and the control messages. The control messages broadcasted with the content are stored and subsequently reutilized with the index file. In the case that the broadcast messages are not applicable for subsequent use, this document does not teach anything regarding how to solve this problem.

The document EP 1215905 describes a solution in which the content is transmitted with a list containing the control word associated to each part of the content. This list contains an identifier allowing a link to be made between the content broadcasted and the control words stored in the list. This list is prepared at the diffusion centre and broadcasted with the content to allow the synchronization of the control words and the content.

BRIEF DESCRIPTION OF THE INVENTION

In order to fulfil the above mentioned drawbacks, this invention proposes a method to allow a broadcasted content (live) accessible at the time of the diffusion to be accessible also in a different mode thanks to the intermediate storage on the hard disk of the user unit.

This aim is achieved by a processing method of conditional access content (DT) by a user unit (STB), this unit receiving a data stream (DT) encrypted by at least one control word (CW), a first control message stream (ECM) broadcasted with the data stream (DT) and a second control message stream (PECM) broadcasted in a non-simultaneous way, characterized in that this method includes the following steps:

formation of an index file (ID_TB), each index comprising on one hand an identifier of a control message of the first control message stream and formed by the extraction of data associated to said first control messages (ECM) and_ comprising on the other hand an identifier of the part of the content to which this control message is applied, during the deferred processing of the content (DT), extraction of at least one part of the second control messages, resynchronization of the content with the second control messages through the use of the index file, the current identifier of the content serving as a pointer for the identifier of the part of the content of the index file (IB_TB) and the identifier of the first corresponding control message allowing the selection of the second corresponding control message from among the set of second control messages.

This method allows the use of an index file that is formed during the broadcast of the content, this index will be used during the deferred use of the content.

This index file includes at least two values, namely the identifier of a control message and the identifier of the part of the content to which this control message is applied. The message identifier will be, for example, a simple counter that counts the messages while the pointer identifier of the content can take numerous forms. This pointer can represent an offset in bytes from the beginning of the content, a frame counter, a GOP counter (Group of Pictures), a time stamp, a storage positioning pointer on the hard disk or any other pointer which allows an item of equipment to locate a position in the content.

In a first version called unassisted, this file is formed in the user unit. The latter forms the index file without any assistance, namely by identifying a first control message and by counting the messages in order to establish a control message identifier. Likewise, for each detection of a new control message, the user unit will extract a piece of positioning data of the content as mentioned above. In a particular version, it could concern a data block stored on the disk.

According to a second version called partially assisted, it is possible to extract from the first control message an identifier of said message in order to form the index file. The identifier of the position in the content is established by the user unit through the detection of the position in the content at this stage.

According to a third version called assisted, the first control messages not only contain an identifier of the control message, but also the identifier of the part of the content where this message is applied.

It possible to have variants of these versions, namely a first control message containing the positioning identifier in the content and a counting system to establish the identifier of the message.

The data extracted from the control messages are preferably in a part not encrypted by the transmission key so as not to depend on the authorization to this content to create the index file. In fact, the access conditions to the "live" content are different and this method is independent from the fact that the content is accessible to the related user or not.

At the time of the access to the content in a deferred mode, the access conditions of the second control messages that will be taken into account.

In a simplified version of the invention, the index file contains the deferred control message in place of the message identifier. This is possible if these messages are broadcasted at the same time as the content and the user unit will store the deferred control messages in a file with the identifier of the part of the content to which this message is applied.

It should be noted that this version does not require the presence of the control message "live" and can function even if this type of message is absent.

BRIEF DESCRIPTION OF THE DRAWINGS

The invention will be better understood thanks to the detailed following description that refers to the enclosed drawings that are given as a non-limitative example, namely.

DETAILED DESCRIPTION OF THE INVENTION

The diffusion centre HE is responsible for the "live" diffusion of a content DT encrypted by at least one control word CW. This encryption can either take place prior to diffusion (pre-encryption) or during diffusion. Control messages ECM are formed to contain these control words CW, these messages comprising, in addition to the control word, the access conditions to the content, a time marker, or even according to the versions, a message identifier ID_ECM that can be a simple message counter. If the control word and the access conditions must be encrypted by the transmission key TK in order to avoid fraud, the other data can be in an unencrypted part of the message.

It should be noted that the message identifier can be the time marker or a cyclic redundancy check crc applied to a control message ECM.

Figure 1:
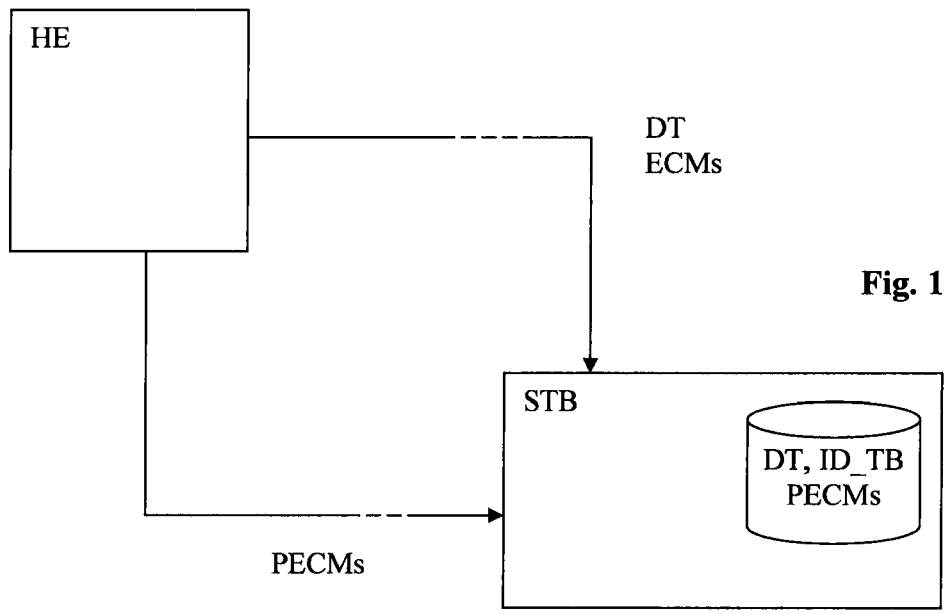
FIG. 1 shows the main elements of the invention, namely a diffusion centre and a user unit.
Figure 2:
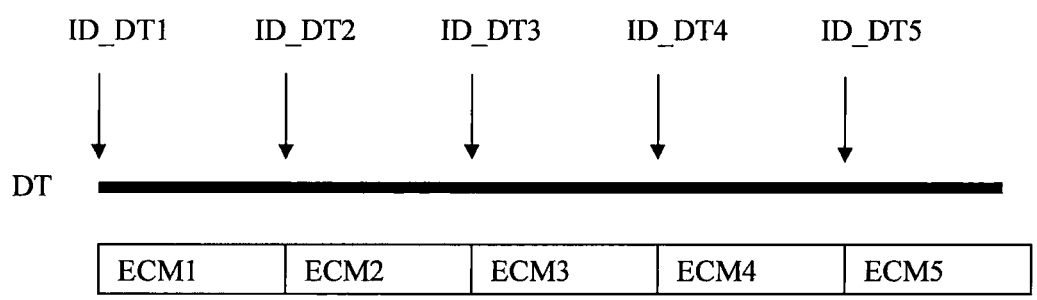
FIG. 2 shows the creation mechanism of the index table.
Figure 2:
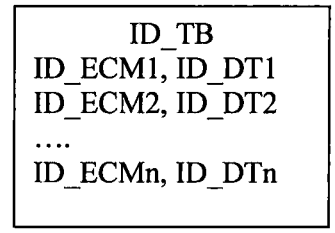

At the time of the diffusion, the diffusion centre sends the data stream DT and the control message stream ECMs. For the user unit, it is necessary to dispose of the transmission key TK in order to be able to decrypt the control messages. According to the access protection systems, the availability of the transmission key TK is not sufficient for a security module to accept to decrypt and return the control word to the user unit. The security module verifies if the right required in the control message is present in said module and returns the control word only in the affirmative case. The diffusion centre also sends a deferred control message stream PECM that can be sent in the same stream as the control messages ECM, in the same stream as the content or deferred. The formation of the index table ID_TB shown in FIG. 2 is carried out according to several methods. In the first version called unassisted, this file is formed in the STB user unit. The latter is made up of the index file by creating an index for each control message ECM received. This index ID_ECMn can be a simple counter or a time stamp in particular. For each detection of a new control message, the user unit will extract a piece of positioning data of the content. This data allows the generation of an identifier of the part of the content to which this control message is applied. This data ID_DTn can be a byte offset in the data stream or simply an index of the data block stored on the hard disk.

According to one alternative of this method, if the deferred control messages PECM are broadcasted at the same time as the content DT, it is possible to form the index by extracting the message identifier on the deferred control message PECM. It is not therefore necessary to dispose of a "live" control message stream ECM.

According to the second version called partially assisted, it is possible to extract from the control message ECM an identifier ID_ECMn of said message in order to form the index file. The identifier of the position in the content is established by the user unit through the detection of the position in the content at this stage.

According to the third version called assisted, the control messages ECMs not only contain an identifier of the control message, but also the identifier of the part of the content where this message is applied.

This index table ID_TB is stored on the hard disk with the content DT. According to the embodiment of the invention, the set of deferred control messages PECMs is either simultaneously transmitted with the control messages ECMs, or at a second moment, for example at the time of the purchase of the content DT. In this case, the access conditions will be extracted from the deferred control messages, also called second control messages. With regard to the control words CW, the latter can be extracted either from the first control messages (live) or from the second control messages.

Whether the content has been seen or not at the time of the diffusion is of no importance. At the time of the purchase of the content DT, the diffusion centre (or another centre managing the deferred purchase) sends a message containing the key MK allowing the decryption of the deferred control messages PECMs. Although the action of a security module is preferred, it is possible to carry out the different steps of the invention without this type of module. Once the key MK has been received by the user unit, the latter can decrypt the deferred control messages PECMs. The index table is used to identify which message PECM must be used at the time of the re-diffusion of the content DT.

It should be noted that the key MK allowing the decryption of the deferred control messages PECM can be a key pertaining to said content DT or a key pertaining to several contents, such as a series, or even in a more general way, a key which pertains to the deferred use of a content, regardless of the content. Access to a specific content is preferably managed by rights that are placed in the deferred control messages.

According to the example of the content pointer linked to the storage index on the hard disk, at the time of the reading of said data block, the index table on the basis of this identifier ID_DTn, will return the corresponding index ID_ECMn and thus allow the corresponding deferred control message PECMn to be found. This implies that the indexation of the "live" control messages ECM and the indexation of the deferred messages PECM is the same.

According to the simplified alternative, the index table stores directly the deferred control message PECM at the time of the formation of said table in place of the message identifier. This means that it is possible to broadcast the content without the presence of the immediate control message stream (ECM). This alternative allows the storage in advance of content that will be then proposed to the user.

In an alternative with security module, the STB user unit receives an EMM right message containing the key pertaining to this content MK and the rights to access it. Therefore, the security module can not only decrypt the deferred control messages PECMs, but also verify that the access conditions to this content are fulfilled.

In an alternative of the invention, the index file is created in the diffusion centre and transmitted either with the content, or during the transmission of the set of deferred control messages PECM. In this way, the indexation of the content DT will be only pertain to the content, for example, by a frame offset or a time stamp. The indexation relative to storage of data of the content pertains to each user unit and is thus unknown to the diffusion centre.

According to one alternative of the invention, the index table ID_TB contains for each message identifier ID_ECM two content identifiers IDa_DT, IDb_DT. This allows easy location at the time of the fast-forward or rewind of the corresponding message PECM. If the part of data DT in process of being accessed is comprised in the interval, the control message pointer allows the message PECM to be used to be found.

The invention claimed is:

1. A method for processing of conditional access content by a user unit, the method comprising the steps of:
receiving at a user unit a data stream comprising content, different portions of the content in different positions in the data stream being encrypted by different control words, a first control message stream broadcasted with the data stream and a second control message stream broadcasted subsequent to the first control message stream; each of the control messages in the first control message stream and the second control message stream including a control word pertaining to a partial portion of the content in the data stream, each of the control messages in the first control message stream including a first access condition, each of the control messages in the second control message stream including a second access condition different from the first access condition;
forming by the user unit an index file, each index in the file comprising an identifier of a control message of the first control message stream formed by the extraction of data associated to said first control messages, each index further comprising an identifier of a position in the data stream of the part of the content to which the control message is applied;
during a deferred processing of the content, extracting by the user unit at least some of the second control messages in the second control message stream, and resynchronizing the content with the second control messages through the use of the index file, the current identifier of the content serving as a pointer for the identifier of the part of the content of the index file and the identifier of the first corresponding control message allowing the selection of the second corresponding control message from among the second control messages; and
extracting by the user unit a second access condition from the second control message stream and verifying a user entitlement based on the second access condition.

2. The method according to claim 1, wherein the stream of first control messages pertains to the immediate use of the content.

3. The method according to claim 1, wherein the identifier of the control message is extracted from the data transmitted with the first control message.

4. The method according to claim 1, wherein the identifier of the first control message is obtained by counting the first control messages.

5. The method according to claim 1, wherein the identifier of the part of the content is obtained through the extraction of a fast-forward indicator of the content at the time of the detection of a new first control message.

6. The method according to claim 5, wherein the indicator is a frame counter.

7. The method according to claim 5, wherein the indicator is a time stamp.

8. The method according to claim 5, wherein the indicator is a frame group counter (GOP).

9. The method according to claim 1, wherein the identifier of the part of the content is obtained through the storage position of the content at the time of the detection of a new first control message.

10. The method according to claim 1, wherein the index table includes two identifiers of the part of the content, the first identifier at the time of the detection of a new first control message, the second at the time of end of the validity of the first control message in question.

11. The method according to claim 1, wherein said first and second access conditions are identical.

12. The method according to claim 1, wherein the user unit comprises a security module, and wherein at least the step of verifying the second access condition is performed by the security module.

13. A user unit for processing of conditional access content, the user unit comprising:
- a receiver;
- a processor connected to the receiver; and
- a storage unit connected to the processor;
- wherein the user unit is configured to perform the steps of
  - receiving a data stream comprising content, different portions of the content in different positions in the data stream being encrypted by different control words, a first control message stream broadcasted with the data stream and a second control message stream broadcasted subsequent to the first control message stream, each of the control messages in either or both of the first control message stream and the second control message stream including a control word pertaining to a partial portion of the content in the data stream, each of the control messages in the first control message stream including a first access condition, each of the control messages in the second control message stream including a second access condition different from the first access condition;
  - forming an index file, each index in the file comprising an identifier of a control message of the first control message stream formed by the extraction of data associated to said first control messages, each index further comprising an identifier of a position in the data stream of the part of the content to which the control message is applied;
  - during a deferred processing of the content, at least some of the second control messages in the second control message stream, and resynchronizing the content with the second control messages through the use of the index file, the current identifier of the content serving as a pointer for the identifier of the part of the content of the index file and the identifier of the first corresponding control message allowing the selection of the second corresponding control message from among the second control messages; and
  - extracting a second access condition from the second control message stream and verifying a user entitlement based on the second access condition.

14. The user unit according to claim 13, wherein the identifier of the position in the data stream of the part of the content to which the control message is applied is a pointer selected from the group consisting of an offset from the beginning of the content, a frame counter, a group of pictures counter, a time stamp, and a position on a storage medium.

15. The user unit according to claim 13, wherein said first and second access conditions are identical.

16. The user unit according to claim 13, further comprising a security module, wherein at least the step of verifying the second access condition is performed by the security module.

* * * * *

UNITED STATES PATENT AND TRADEMARK OFFICE
CERTIFICATE OF CORRECTION

PATENT NO. : 8,458,739 B2
APPLICATION NO. : 12/064427
DATED : June 4, 2013
INVENTOR(S) : Thomas et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 674 days.

Signed and Sealed this
Eighth Day of September, 2015

Michelle K. Lee
*Director of the United States Patent and Trademark Office*